United States Patent [19]

Stoll et al.

[11] 4,258,067
[45] Mar. 24, 1981

[54] METHOD FOR INTRODUCING A PULVERULENT MATERIAL INTO MEAT OR THE LIKE

[75] Inventors: Dieter Stoll, Winterbach; Oswald Kunz, Marpingen, both of Fed. Rep. of Germany

[73] Assignee: Ludwig Scheid GmbH Spezialpräparate und Gewurze zur Fleischverarbeitung, UM./U/ berherrn, Fed. Rep. of Germany

[21] Appl. No.: 940,187

[22] Filed: Sep. 7, 1978

[30] Foreign Application Priority Data

Sep. 8, 1977 [DE] Fed. Rep. of Germany ....... 2740429

[51] Int. Cl.³ .......................... A23L 1/31; G01F 11/00
[52] U.S. Cl. ...................................... 426/281; 99/533; 128/265; 141/329; 222/1; 222/373
[58] Field of Search .......................... 99/532, 533, 535; 426/281, 654; 128/268, 265; 141/329; 222/193, 200, 630, 637, 394, 373, 1; 17/42.1

[56] References Cited

U.S. PATENT DOCUMENTS

| | | | |
|---|---|---|---|
| 2,887,035 | 5/1959 | Seversky | 99/532 |
| 3,232,493 | 2/1966 | Beard, Jr. | 128/265 X |
| 3,483,810 | 12/1969 | Peters et al. | 99/532 |
| 3,754,469 | 8/1973 | Gasior | 99/532 |
| 3,769,037 | 10/1973 | Sholl | 426/281 |

FOREIGN PATENT DOCUMENTS 38947 2/1972 Australia ................................... 99/532

Primary Examiner—S. Leon Bashore
Assistant Examiner—Steve Alvo
Attorney, Agent, or Firm—Peter K. Kontler

[57] ABSTRACT

A hollow needle is mechanically inserted into a piece of meat prior to admission of pulverulent salt into its interior. The leading end of the axial passage in the needle is sealed by a retractible plunger during introduction of the needle. The plunger is thereupon retracted and a first valve is opened to admit pulverulent salt which trickles into the needle from above by gravity flow. The admission of salt into the needle is promoted by a vibrator which agitates the magazine for salt and/or the needle. A second valve is opened simultaneously with or subsequent to opening of the first valve to admit into the needle compressed gas at a pressure slightly exceeding atmospheric pressure whereby the gas urges the column of pulverulent salt into the hole, which has been formed by the needle, while the needle is being extracted from meat. The pressure of gas is less than that pressure at which salt would be expelled into and would expand the piece of meat in inserted condition of the needle.

10 Claims, 1 Drawing Figure

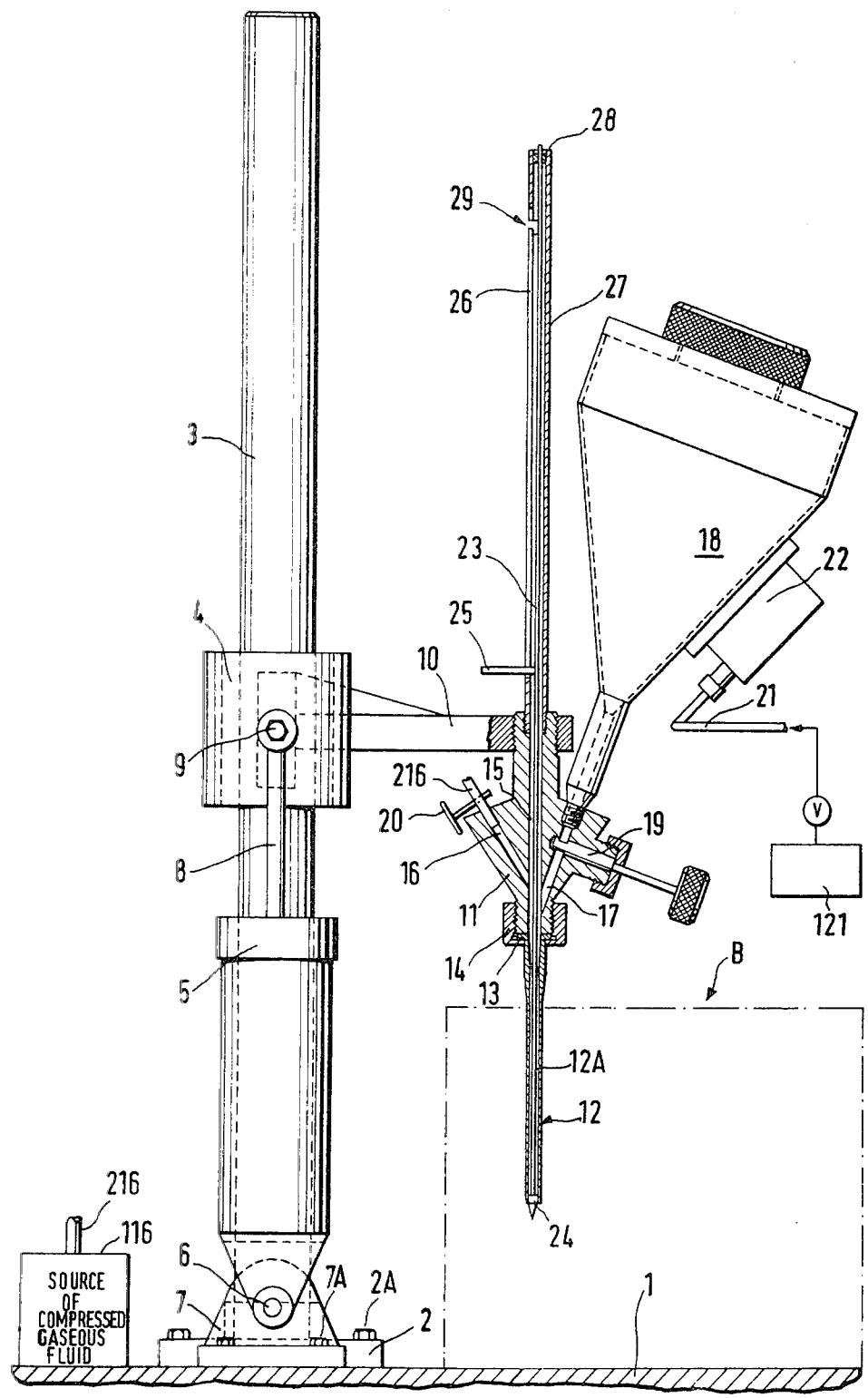

METHOD FOR INTRODUCING A PULVERULENT MATERIAL INTO MEAT OR THE LIKE

BACKGROUND OF THE INVENTION

The present invention relates to a method and apparatus for introducing a pulverulent or granular substance into a puncturable body, especially for introducing powdered salt into meat.

It is known to pickle meat (such term is intended to embrace all kinds of raw or processed meat as well as fish) by placing a body of meat into a supply of crystalline salt or into a highly concentrated solution of salt in water. Penetration of salt into meat takes place as a result of diffusion. At the same time, the solution or the crystals withdraw water, juices and/or other liquids from meat. The just described pickling procedures exhibit the drawback that the operation is slow, even if the meat is pickled in the form of relatively thin slices.

It is also known to inject brine (i.e., a concentrated solution of salt in water) into various types of meat. This accelerates the treatment; however, the injection involves introduction of liquid into the interior of meat, i.e., the injected liquid must be withdrawn in addition to that liquid which is contained in meat prior to injection of brine. Furthermore, injection of brine creates many additional problems. For example, the liquid in which salt is dissolved can contain microorganisms which are likely to affect the quality and/or to promote rapid spoilage of meat. Moreover, the solution expands the channels in a piece of meat to form enlarged chambers which are filled with liquid and constitute breeding grounds for bacteria in spite of the presence of salt in the confined liquid. It has been found that the just discussed channels often or invariably promote the growth of bacteria, either of those which are introduced as a result of injection or of bacteria which are contained in meat prior to introduction of brine. Still further, the formation of chambers or enlarged channels adversely affects the consistency of meat and the injected liquid contributes to sliminess of meat, a condition which is highly conducive to spoilage.

OBJECTS AND SUMMARY OF THE INVENTION

An object of the invention is to provide a novel and improved method of introducing pulverulent or granular substances, especially salt, into puncturable solid bodies, particularly meat.

Another object of the invention is to provide a novel an improved method of pickling meat without adversely affecting the consistency, appearance and/or freshness and edibility of meat.

A further object of the invention is to provide a method which renders it possible to admit controlled quantities of pulverulent or granular material into slices, slabs, blocks or otherwise shaped bodies of meat or the like with little loss in time and by insuring that the particulate material is admitted into the selected part or parts of the body.

An additional object of the invention is to provide a method which renders it possible to distribute introduced pulverulent or granular material uniformly or nearly uniformly in one or more selected parts of the puncturable body.

Another object of the invention is to provide a novel and improved apparatus which can be utilized for the practice of the above outlined method.

A further object of the invention is to provide an apparatus which can be used for pickling of meat in households or smaller commercial establishments and which can be readily modified and designed for pickling of meat on a large scale, e.g., in large butcher shops, restaurants, hotels, schools, passenger ships and like institutions which must be equipped with facilities for feeding large numbers of persons.

An additional object of the invention is to provide an apparatus which renders it possible to pickle all types of meat within a fraction of the time which is required to complete such treatment by resorting to conventional apparatus, which is less likely to contaminate the meat, and which insures maximum economy as concerns the consumption of salt.

Another object of the invention is to provide an apparatus which is relatively simple, compact, inexpensive and rugged, and whose energy requirements are surprisingly low.

One feature of the invention resides in the provision of a method of introducing a granular or pulverulent substance (hereinafter called powder) into a puncturable solid body, especially for introducing effective amounts of pulverulent salt into meat. The method comprises the steps of introducing into the body an elongated hollow needle, admitting into the interior of the needle a column of powder from a magazine or another suitable source, applying to the column a pressure which exceeds the pressure of the surrounding atmosphere but is less than that pressure at which the powder would penetrate into and expand the body in the region of the inserted needle, and withdrawing the needle while continuing the application of pressure to the rear end of the column so that the column remains in the hole which has been formed by the needle. The admission of powder into the interior of the needle can be promoted by agitating the powder which flows into the needle.

It is preferred to seal the leading end of the axial passage in the needle during introduction of the needle into the body of puncturable material. This prevents penetration of a plug of tissue into the passage of the needle and/or the penetration of liquid matter, such as water or juices which are contained in meat prior to pickling. The pressure-applying step preferably comprises introducing into the needle, behind the column of powder, a gaseous fluid (e.g., clean air) at a pressure of 0.5 to 1 atmosphere superatmospheric pressure, normally approximately one atmosphere. Such pressure insures that the column of powder remains in the body upon completion of the withdrawing step, and also that the body does not expand to form chambers or enlarged channels as a result of expulsion of powder from the needle while the latter is in the process of being withdrawn from the body.

The step of admitting powder into the needle can but need not always precede the withdrawing step. For example, the needle can be partially or completely filled with powder prior to introduction into the body (i.e., prior to making a hole in the body), during introduction of the needle, or subsequent to introduction of the needle but prior to start or completion of the withdrawing step. It is also possible to admit powder from that moment on when the withdrawing step is started so that the admission of powder into needle and the expulsion of powder from the needle take place simultaneously with extraction of the needle from the body.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a somewhat schematic partly elevational and partly sectional view of a rudimentary apparatus which is constructed and assembled in accordance with the present invention and serves for introduction of a pulverulent substance into a body of meat or like puncturable material by resorting to a single hollow needle.

DESCRIPTION OF THE PREFERRED EMBODIMENTS

The apparatus which is shown in the drawing comprises a base plate or table 1 which serves as a support for a piece of meat (indicated by phantom lines, as at B) which is to be permeated with a pulverulent substance, e.g., finely comminuted salt. The table 1 further carries a support 2 which is secured thereto by screws 2A or analogous fasteners and is rigidly or separably connected with an elongated upright guide 3 here shown as a cylindrical post. The post 3 guides a cylindrical sleeve 4 which is movable lengthwise of the post by a motor, e.g., a single-acting or double-acting cylinder and piston unit having a cylinder 5 whose lower end portion is articulately connected to a bracket 7 on the table 1 by a horizontal pivot pin 6 and whose piston rod 8 is articulately connected to the sleeve 4 by a horizontal coupling pin 9. The bracket 7 may constitute an integral or separable part of the support 2, or it may be secured directly to the table 1, e.g., by screws 7A or analogous fasteners.

The sleeve 4 is rigid with a substantially horizontal arm 10 which is threadedly connected with the upper end portion of a holder 11 for an elongated hollow tubular needle 12. The lower end portion of the holder 11 is formed with external threads meshing with the internal threads of a nut 14 which constitutes a means for separably coupling the needle 12 to the holder 11. The upper end portion of the needle 12 has an annular flange 13 which is maintained in contact with the lower end face of the holder 11 by the nut 14. Thus, the needle 12 can be readily removed, e.g., for the purpose of cleaning, by the simple expedient of separating the nut 14 from the externally threaded lower end portion of the holder 11.

The needle 12 has an axial bore or passage 12A which is open at its lower end, i.e., at the leading end of the needle 12, and communicates with a passage or bore 15 in the holder 11. The latter is further formed with a first inclined bore 16 which constitutes an inlet for admission of a compressed gaseous fluid (e.g., sterilized air) and with a second inclined bore 17 which constitutes an inlet for admission of a pulverulent substance, namely, finely comminuted salt which is dispensed by a source 18 here shown as a magazine which can be refilled at intervals, either by hand or automatically. The inlet 17 communicates with the bore 15 ahead of the inlet 16, as considered in the direction of admission of powder into the passage 12A, i.e., the inlet 17 is disposed slightly behind the locus of admission of powder so that the gaseous fluid can apply pressure to the rear or upper end of a column of powder which accumulates in the passage 12A when a valve 19 for admission of powder from the magazine 18 is open. The source of gaseous fluid is shown at 116; this source is connected with the inlet 16 by a conduit 216 which contains a suitable valve 20.

The magazine 18 carries a pneumatically operated vibrator 22 which is connected with a suitable source 121 of compressed air by an at least partly flexible conduit 21. The exact construction of the vibrator 22 forms no part of the invention; it suffices to say that this vibrator constitutes a means for agitating the supply of powder in the magazine 18 to thus promote the flow of powder toward, through and beyond the inlet 17 when the valve 19 is open.

The upper end portion of the holder 11 is further threadedly connected with the lower end portion of an elongated cylindrical barrel 27 forming part of a device for sealing the lower end of the passage 12A during introduction of the needle 12 into the body B. The sealing device further comprises a relatively short piston or plunger 24 (shown in the lower end position in which its upper portion seals the lower end of the passage 12A and its pointed conical tip extends downwardly beyond the needle 12) and an elongated piston rod 23 which extends upwardly through the passage 12A and bore 15 and into the barrel 27. The means for moving the piston 24 up and down comprises a handle 25 which extends outwardly through an axially parallel slot 26 of the barrel 27. A portion of the piston rod 23 extends through an annular bearing 28 which is installed in the upper end portion of the barrel 27. The upper end portion of the slot 26 communicates with a laterally extending slot 29 (i.e., the slot 29 extends in the circumferential direction of the barrel 27). When the handle 25 is moved to its upper end position and thereupon about the axis of the barrel 27 to enter the slot 29, the plunger 24 is held in the retracted (upper end) position. If desired, a slot similar to the slot 29 can be provided at the lower end of the slot 26 to enable an attendant to lock the plunger 24 in the illustrated lower end position. When moved to the upper end position (in which the handle 25 extends into the slot 29), the plunger 24 is located at a level above (behind) the inlet 16 for admission of compressed gaseous fluid. The fluid in the source 116 may be maintained at a pressure of 0.5 to 4 atmospheres superatmospheric pressure. It has been found that such pressure range suffices to insure that the column of powder which has been admitted into the passage 12A remains in the body B when the needle 12 is extracted by actuating the cylinder and piston unit 5, 8 in a direction to move the sleeve 4 upwardly, as viewed in the drawing. On the other hand, the pressure which is actually applied to powder in the passages 12A and 15 (normally about one atmosphere) is too low to cause the column of powder to penetrate into the body B by expanding or destroying the tissue of the body at the lower end of the needle 12. In other words, the column of powder merely fills or partially fills the hole which is formed as a result of introduction of the needle 12 into the body but the powder does not dilate the body around the hole.

The operation is as follows

The body B is placed onto the table 1 at a level below the needle 12 which is maintained in the upper end position. Thus, the piston rod 8 of the cylinder 5 maintains the sleeve 4 at a level at which the distance between the conical tip of the plunger 24 and the upper side of the table 1 suffices to allow for convenient placing of the body B below the needle. The magazine 18 contains a supply of powder. The cylinder 5 is thereupon actuated to move the sleeve 4 downwardly whereby the arm 10 and the holder 11 compel the pointed exposed tip of the plunger 24 and the needle 12 to penetrate into and to form a hole in the body B on the table 1. As mentioned above, the barrel 27 can be provided with means (e.g., a lateral slot at the lower end of the longitudinal extending slot 26) to allow for retention of the plunger 24 in the lower end position so that the attendant need not apply pressure to the handle 25 while the cylinder 5 causes the piston rod 8, sleeve 4, arm 10 and holder 11 to introduce the needle 12 into the body B. The plunger 24 seals the lower end of the passage 12A so that the interior of the needle cannot be clogged by tissue and/or by liquid contents of the body B. In the next step, the handle 25 is moved upwardly to lift the plunger 24 to its upper end position at a level above the inlets 16 and 17. The handle 25 is retained in the corresponding end position by introducing it into the lateral slot 29.

The attendant thereupon opens the valves 19 and 20 so that the inlet 16 can admit powder which trickles from the magazine 18 and whose flow into the passage 12A is promoted by the vibrator 22. The inlet 16 admits compressed gaseous fluid which forms a cushion bearing against the upper end of the column of powder that accumulates in the passage 12A. The valve 19 is closed when the passage 12A is filled with powder all the way to the level of the inlet 16. The arrangement may be such that the vibrator 22 is deactivated in automatic response to closing of the valve 19. The valve 20 remains in open position, i.e., gaseous fluid in the inlet 17 continues to apply pressure to the upper end of the column of powder in the passage 12A.

The cylinder 5 is thereupon actuated to lift the sleeve 4 and to thereby withdraw the needle 12 from the body B on the table 1. The cushion of compressed gaseous fluid above the column of powder causes the column to remain in the hole of the body B, i.e., the needle 12 moves relative to such column and the latter remains embedded in the body B. Since the pressure of gaseous fluid is preferably maintained within the aforementioned range of 0.5 to 1 atmosphere superatmospheric pressure, such pressure does not suffice to cause any or excessive compacting of powder in the hole of the body B. In other words, the density of the column which remains in the body does not appreciably exceed that density which would develop in the absence of pressure at the upper end of the column. The expulsion of powder from the rising needle 12 can be promoted by the vibrator 22, i.e., the vibrator can agitate the needle while the piston rod 8 moves upwardly. The valve 20 is closed not later than when the needle 12 is fully extracted.

If necessary, the attendant then shifts the body B to another position, and the just described sequence of steps is repeated in order to provide the body with another hole which is filled with a column of powder. The body B can be turned or otherwise moved to any one of a practically infinite number of different positions to insure adequate distribution of powder in its interior. Furthermore, and if the lower end portion of the post 3 is articulately connected to the table 1 or support 2, the holder 11 can be moved up and down as well as sideways so that the position of the body B need not be changed when the attendant proceeds to make a second hole therein.

The operation of the illustrated apparatus can be automated, especially if the apparatus is intended for use in a larger establishment, such as a large butcher shop or the kitchen of a restaurant. Thus, the sequence of various steps can be controlled by an automatic programming unit to automatically lower the sleeve 4 when a piece of meat or the like is placed below the needle, to automatically open the valves 19 and 20, to automatically close the valve 19, to automatically lift the holder 11 and to thereupon automatically close the valve 20. Also, the holder 11 may carry two or more needles or two or more groups or sets of needles which can receive powder from a common source or from discrete magazines. Furthermore, the needles can be moved nearer to or further away from each other, depending on the dimensions of the body which is to be permeated with a pulverulent substance. The needles may but need not be mounted on a common holder, and the apparatus may be further equipped with motor means for moving the plunger or plungers 24 up and down. All such modifications will readily occur to those who are skilled in this art.

It has been observed that, when the apparatus is in use and the valve 20 is open, some fluid which forms a cushion above the column of powder in the passage 12A seeps downwardly through the column and escapes through the open lower end of the needle 12 to rise along the external surface of the needle while the latter is confined in the body B on the table 1. The pressure of fluid which penetrates through the column of powder in the passage 12A decreases in a direction toward the lower end of the needle, and the pressure of such fluid is further reduced at the point where the fluid issues from the passage 12A at the lower end of the needle. Thus, a pressure differential is established between the upper end of the column of powder and the open lower end of the needle, and such pressure differential promotes the expulsion or removal of the column from the passage 12A while the cylinder 5 lifts the needle 12 to extract the latter from the punctured body on the table 1. The just discussed pressure differential is established in all axial positions of the needle 12, i.e., it is not destroyed while the needle rises so that it insures predictable evacuation of the contents of the needle while the latter is being extracted from the body on the table 1. As mentioned above, the pressure of fluid which is admitted via inlet 16 is preferably too low to effect appreciable densification of the column of powder in the passage 12A and/or in the hole of the body B.

It will be noted that the method which can be practiced by resorting to the improved apparatus does not involve or constitute an injection such as takes place when the needle of a syringe is caused to penetrate into the body of a patient and a plunger is actuated to expel the contents of the syringe into the body prior to extraction of the needle. In other words, the column of powder which is to remain in the body B is confined only in the needle 12 and is permitted or caused to enter the hole which has been formed by the needle 12 only while the needle is being withdrawn from the body. Such mode of introduction insures that the pulverulent material cannot dilate the body from the inside, i.e., that the diameter of the hole which has been formed by the hollow needle 12 does not increase as a result of introduction of the column of powder. The column merely fills the hole which has been formed by the needle 12 and plunger 24. Consequently, the powder does not cause the formation of enlarged channels or internal chambers during or subsequent to withdrawal of the needle 12. In other words, the apparatus does not cause the powder to penetrate into the material of the body around the hole but merely enables the powder to form a column which fills a hole already existing at the time the powder leaves the passage 12A. The application of slight pressure to that end of the column which is remote from the inner end of the hole in the body B is desirable and advantageous because this insures that the powder does not share the movement of the needle 12 during retraction under the action of the cylinder 5. The pressure could also be applied by mechanical means; however, the provision of means for admitting compressed gaseous fluid is preferred because, by properly regulating the pressure of fluid in the source 116, one can insure predictable evacuation of the contents of the passage 12A while the needle 12 is in the process of being withdrawn from the body B.

The application of pressure need not begin simultaneously with admission of powder into the passage 12A, i.e., the valve 20 can be opened after the valve 19 closes, namely, when the passage 12A already contains a column of pulverulent material. In the latter instance, the valve 20 is preferably opened gradually to avoid abrupt application of full pressure to the upper end of the column. Such abrupt rise of pressure of the gaseous cushion above the column could result in localized densification or compacting of powder in the passage 12A.

It will be seen that the sequence of various steps can be selected almost at will, as long as the passage 12A is at least partially filled with powder at the time when the cylinder 5 is actuated to withdraw the needle 12 from the body B. The exact pressure of gaseous fluid in the inlet 16 can be selected as a function of several parameters, such as the particle size of material in the magazine 18, the composition of powder (e.g., its moisture content), the inner diameter of the needle 12 and/or others. For example, and if the particle size of powder is very small so that the gaseous fluid which is admitted via inlet 16 cannot readily penetrate through the pulverulent contents of the inserted needle 12, expulsion of powder from the needle 12 while the latter is being lifted by the cylinder 5 can take place as a result of pressure differential which necessarily develops owing to extraction of the needle 12 from the hole in the body B. In other words, and especially if the needle 12 is lifted at a relatively high speed, the elasticity of the material of the body B will not suffice to immediately close the hole below the lower end of the needle 12. Therefore, the pressure in the unfilled part of the hole will decrease and the powder will be compelled to enter the hole by suction.

It is further clear that the needle can be provided with two or more outlets for discharge of powder into the body B. For example, the needle can have one or more lateral ports which communicate with the passage 12A; such ports are less likely to be clogged than the lower end of the needle 12. However, it has been found that the pressure which is needed to insure predictable expulsion of powder through one or more lateral ports while the needle is being withdrawn is much higher than the pressure which insures predictable expulsion of a column of powder through the lower end of the needle.

As mentioned above, the plunger 24 preferably seals the open lower end of the needle 12 while the latter is caused to penetrate into a piece of meat or the like. This reduces the likelihood that the needle 12 would cut a plug of meat which would penetrate into the passage 12A and would adhere to the internal surface of the needle 12 with a force such that it could not be overcome by the application of pressure in the aforediscussed range of 0.5 to 1 atmosphere superatmospheric pressure. At such relatively low pressure, the valve 20 is preferably held in open position during the entire interval of extraction of the needle 12 because the gas which finds its way through the column of powder and escapes along the outer side of the inserted needle 12 is likely to cause a pronounced drop of pressure at the upper end of the column except if the valve 20 remains open.

The apparatus can be used with equal advantage for introduction of other types of pulverulent material into pieces of meat or the like. For example, the apparatus can be used to introduce various types of spices including pepper or the like.

Depending on the circumstances, i.e. the parameters, the abovementioned pressure differential which necessarily develops owing to the extraction of the needle 12 from the hole in the body B and the attendant development of suction in the hole can alone be sufficient to compel the powder to enter the hole and therefore can be the only means for this purpose. Accordingly, in this case only the extraction of the needle 12 would constitute the said pressure applying step according to the invention whereby the pressure applied to the upper end of the column is that of the ambient atmosphere and exceeds the pressure of the surrounding atmosphere at the lower end of the needle 12, i.e. in the hole.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptions should and are intended to be comprehended within the meaning and range of equivalence of the claims.

We claim:

1. A method of introducing a powder into a puncturable body, comprising the steps of introducing into the body a hollow needle wherein the needle forms a hole in the body; admitting powder into the needle by gravity flow to form a column of powder in the needle; applying to said column at its trailing end a gaseous pressure which exceeds the pressure prevailing at the region of the leading end of the needle but is less than that pressure at which the powder would penetrate into and expand the body in the region of the inserted needle, said gaseous pressure also being less than that pressure which would cause any substantial compacting of the powder in the hole; and withdrawing the needle while continuing said pressure applying step so that the substantially uncompacted column of powder remains in the hole formed by the needle.

2. The method of claim 1, wherein the needle has an axial passage which has an open end at said leading end, and further comprising the step of sealing said passage at the leading end of the needle in the course of said introducing step.

3. The method of claim 2, wherein said sealing step includes displacing a plunger mounted in said passage for axial displacement into said open end of said passage.

4. The method of claim 3, and further comprising the step of controlling the performance of the aforementioned steps in a sequence commencing with the displacement of said plunger into said open end of said passage, followed by said introducing step performed while said plunger remains in said open end of said passage, followed by the retraction of said plunger to free said passage, and concluding with said admitting, applying and withdrawing steps.

5. The method of claim 4, wherein said controlling step includes so coordinating said admitting, applying and withdrawing steps that said admitting and applying steps are performed simultaneously for a certain time period, that said withdrawing step commences during said time period at the earliest, and that said applying step terminates subsequent to said time period and at the close of said withdrawing step at the earliest.

6. The method of claim 1, wherein said pressure applying step comprises admitting into the needle behind the column of powder a gaseous fluid at a pressure in the range of between 0.5 and one atmosphere superatmospheric pressure.

7. The method of claim 1, wherein said admitting step includes agitating the particles of said column to thereby promote the entry of powder into the needle.

8. The method of claim 1, wherein said admitting step precedes said withdrawing step.

9. The method of claim 1, wherein said admitting step takes place simultaneously with said withdrawing step.

10. The method of claim 1 wherein said powder is salt and said body is of meat.

* * * * *